Sept. 30, 1930. J. C. PIMM 1,776,952
ADVERTISING PANEL FOR AUTOMOBILE DOORS
Filed Jan. 17, 1929
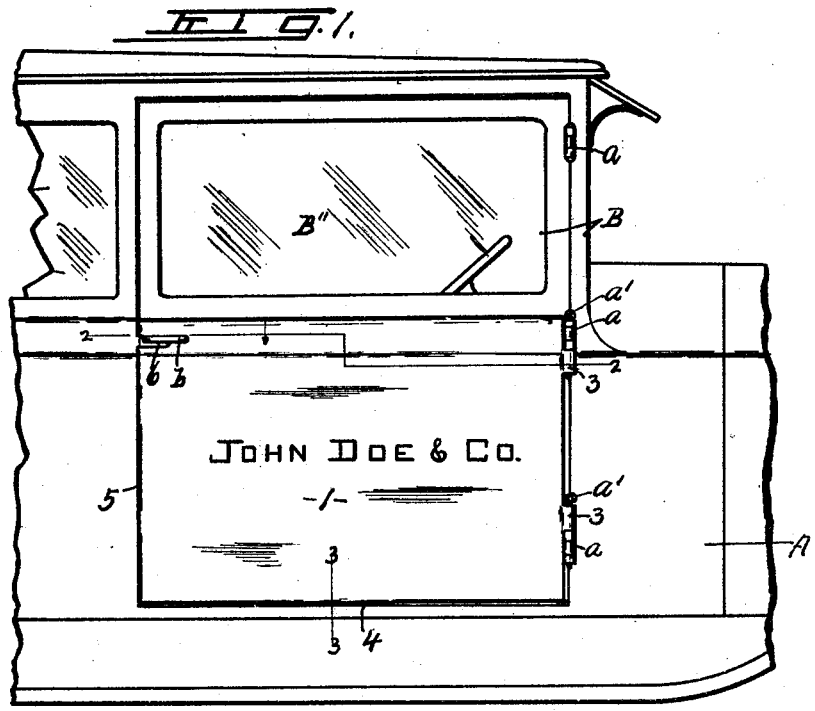
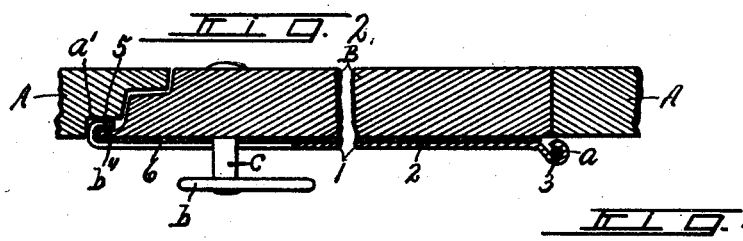
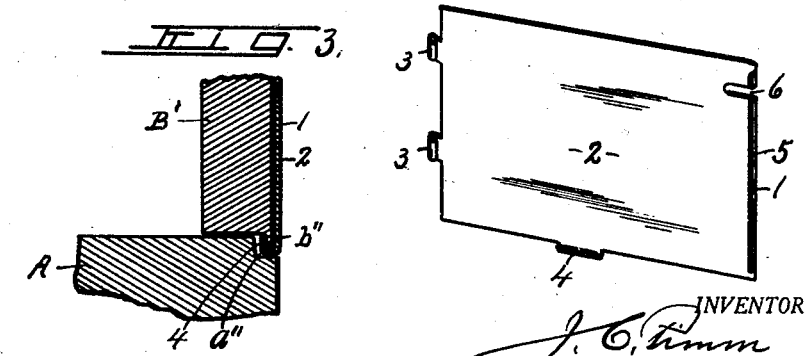

Patented Sept. 30, 1930

1,776,952

UNITED STATES PATENT OFFICE

JOHN C. PIMM, OF SYRACUSE, NEW YORK

ADVERTISING PANEL FOR AUTOMOBILE DOORS

Application filed January 17, 1929. Serial No. 333,149.

This invention relates to an advertising panel for automobile doors adapted to be placed over and upon the outer surface of the usual door panel to open and close with the door for advertising purposes when desired, without in any way, marring or disfiguring the orginal surface of the door.

These doors are usually made and finished to correspond with the body of the vehicle, irrespective of the type of car, whether open or closed and in many instances, the car is used for both pleasure and business purposes.

When used for pleasure purposes, it is desired to preserve the original appearance of the car free from advertising matter, but when the car is used for business purposes, it is desired to use such advertising matter on some part of the car as may be most appropriate for the owner.

The main object therefore, of the present invention is to provide a separate door panel which may be easily and quickly applied to or removed from the outer surface of the permanent door panel for the purpose of receiving and conspicuously displaying such advertising matter as may be desired. Another object is to hold this separate panel in operative position upon the permanent panel of the door in such manner as to avoid any relative movement thereof, and at the same time to permit the door to open and close with the usual facility. A further object is to utilize the hinges and handle of the door as a part of the means for retaining the advertising panel in operative position.

Other objects and uses relating to specific parts of the supplemental panel and to the means for attaching it to the door, will be brought out in the following description:

In the drawings, Fig. 1 is a side elevation of a portion of an automobile body showing my supplemental panel in operative position on one of the side doors.

Figure 2 is an enlarged horizontal sectional view, partly broken away, taken in the plane of line 2—2 of Figure 1.

Figure 3 is an enlarged detail vertical sectional view, taken in the plane of line 3—3 of Figure 1.

Figure 4 is an inner perspective view of the detached advertising panel on a small scale.

In order that the invention may be clearly understood, I have shown a portion of a vehicle body —A— as provided with the usual door —B— having the usual hinge connections —a— along one of its upright edges, and a latch controlling handle —b— near its opposite upright edge.

The vehicle shown is of the closed car type and therefore the door is provided with a body panel —B'— and a window panel —B''—. The outer surfaces of the vehicle body and door may be finished in any desired manner most suitable for pleasure cars and when it is desired to use the car for business or advertising purposes, the body panel of the door may be covered by a supplemental advertising panel —1— corresponding as closely as possible to the dimensions of the permanent panel body of the door, and in order that this supplemental panel may be applied to the body panel of the door without marring the finish of the permanent panel of the door, the supplemental panel is provided with an inner lining —2— of felt or other suitable material adhesively or otherwise secured thereto and also serving as a more or less resilient filler to reduce to a minimum any vibration or noise incidental to the vibration of the supplemental panel.

The hinged edge of the supplemental panel —1— is provided with a pair of vertically spaced apertured lugs or eyes 3 for receiving the pintles or hinge pins —a'— of the hinges —a—, the distance between the outer ends of the lugs 3 being substantially equal to the distance between the inner ends of the hinges —a— so that the lower lug may rest upon the upper end of the lower hinge to hold the adjacent edge of the panel against downward displacement, while the upper lug engages the lower end of the upper hinge to hold the panel against vertical displacement.

The lower edge and opposite upright edges of the permanent door panel are usually provided with outwardly projecting flanges —b''— adapted to enter corresponding rabbets —a''— in the adjacent walls of the door opening to form more or less weather tight joints therewith when the door is closed, the lower flange and also the one adjacent the free upright edge of the door being utilized for receiving and retaining the adjacent portions of the supplemental panel in operative position.

That is, the lower edge of the supplemental panel is provided with a relatively short and upwardly turned flange —4— forming a suitable groove for receiving the adjacent portions of the lower flange —b″— of the permanent panel of the door.

The upright edge of the supplemental panel —1— opposite the hinged edge is also provided with an inwardly and laterally turned flange 5 forming a suitable groove for receiving the adjacent flange —b″— of the permanent panel —B′— of the door, and thereby locking the adjacent portion of the supplemental panel in operative position.

The upright edge of the supplemental panel —1— adjacent the handle —b— is provided with a slot —6— for receiving the shank or stem of the handle and thereby to assist in holding the adjacent edge of the panel against vertical movement relatively to the permanent panel of the door.

The handle —b— extends laterally in opposite directions some distance beyond its shank as —c— while the slot —6— in the adjacent portion of the supplemental panel —1— is open at the free edge of the door and extends laterally a distance beyond the shank —c— slightly greater than the lateral width of the flange —5— to enable the flange —5— to be brought into interlocking engagement with the flange —b″— before attaching the lugs 3 to the hinges —a—, it being understood that the portion of the supplemental panel adjacent the shank —c— is interposed between the handle —b— and outer face of the permanent panel of the door as shown in Figure 2.

When placing the supplemental panel upon the outer face of the permanent panel of the door, the open end of the slot —6— is first registered with the shank —c— of the handle —b— after which the lower flange 4 of the supplemental panel is placed in sliding interlocking engagement with the lower flange —b″— of the permanent panel and then the supplemental panel is moved toward the hinges —a— until the flange 5 of the supplemental panel is brought into interlocking engagement with the adjacent flange —b″— of the permanent panel of the door.

The lower hinge pin —a′— is then removed and the upper hinge pin —a′— partially removed by upward displacement whereupon the lugs 3 on the hinged edge of the supplemental panel will be brought into registration or alignment with the corresponding hinges —a— and the hinge pins —a′— will then be restored to the normal position in their respective hinges —a— and through the openings in the lugs 3, thereby locking the adjacent edge of the supplemental panel to the hinges of the door.

When the supplemental panel is interlocked with the permanent panel of the door including the hinges —a— in the manner described, the inner lining —2— will be brought into close contact with all portions of the outer face of the permanent panel to not only protect said surface against marring, but also to muffle the sound incidental to any vibration of the supplemental panel.

That is, the lining 2 constitutes a more or less pliable or resilient filler between the sheet metal supplemental panel and outer face of the permanent panel of the door so that when the supplemental panel is secured in operative position, it will be more firmly held against vibration.

The outer surface of the supplemental panel, aside from the advertising matter thereon, may be finished to correspond to the finish of the exterior of the permanent panel of the door, but obviously may be otherwise finished if desired.

The form and area of the supplemental panel is preferably made to conform to the permanent panel of the door to which it is applied, so that when in operative position it will appear to be a permanent part of the door.

On the other hand, when removing the panel when it is desired to use the car with its original finish without the advertising panel, it is simply necessary to open the door and then to withdraw the hinge pins —a′— sufficiently to disengage them from the lugs 3 whereupon the panel may be laterally removed from the door by reversing its movements previously described, the supplemental panel being then placed aside for further use when desired.

What I claim is:

1. An advertising attachment for automobile doors comprising a panel of sheet material provided with means for receiving the hinge pins of the door, said panel having additional means for detachable interlocking engagement with one of the edges of the door.

2. An advertising attachment for automobile doors comprising a panel of sheet material with means for receiving the hinge pins of the door, said panel having additional means for detachable interlocking engagement with the edge of the door opposite the hinged edge.

3. An advertising attachment for automobile doors comprising a panel of sheet material provided with means for receiving the hinge pins of the door, said panel having an opening for receiving a portion of the door handle.

4. An advertising attachment for automobile doors having at least two of its edges provided with flanges comprising a sheet metal plate of substantially the same width as the door, and having one of its upright edges provided with means for connection with hinges of the door, and its opposite upright edge provided with means for detachable interlocking engagement with the corresponding edge of the door.

5. An advertising attachment for automobile doors having at least two of its edges provided with flanges comprising a sheet metal plate of substantially the same width as the door, and having one of its upright edges provided with means for connection with hinges of the door, and its opposite upright edge provided with means for detachable interlocking engagement with the corresponding edge of the door, said panel having its lower edge provided with means for detachable interlocking engagement with the lower edge of the door.

6. An advertising attachment for hinged automobile doors having an exterior handle by which the door may be open and closed, said attachment comprising a sheet metal panel of approximately the width of the door and having one of its upright edges provided with means for detachable interlocking connection with the hinge of the door, and its opposite upright edge provided with means for detachable interlocking engagement with the corresponding edge of the door, said panel being provided with an opening for receiving the handle of the door.

7. An advertising attachment for a hinged automobile door comprising a panel of sheet material having means for detachable interlocking connection with at least one of the hinges of the door to hold the adjacent side of the panel against downward displacement, said panel having its opposite side provided with means for detachable interlocking engagement with the adjacent edge of the door to additionally hold the panel against downward movement when adjusted for use.

In witness whereof I have hereunto set my hand this 9th day of January, 1929.

JOHN C. PIMM.